UNITED STATES PATENT OFFICE 2,465,915

STABILIZED CELLULOSE ESTERS AND ETHERS

William J. Myles, Summit, and John H. Prichard, Springfield, N. J., assignors to Celanese Corporation of America, a corporation of Delaware No Drawing. Application January 21, 1947, Serial No. 723,466

15 Claims. (Cl. 106—196)

This invention relates to the preparation of thermoplastic molding compositions, and relates more particularly to improvements in the stabilization of thermoplastic molding compositions having a basis of a cellulose derivative such as, a cellulose ether or cellulose ester.

An object of this invention is the preparation of improved cellulose derivative molding compositions of increased stability and highly resistant to the action of heat, light and other agencies which tend to produce color, brittleness, viscosity break-down, crazing and surface changes in said molded materials.

Another object of this invention is the preparation of stabilized cellulose ether or cellulose ester compositions, employing stabilizing agents which do not of themselves materially affect the viscosity, dimensional stability or resistance to crazing of, or produce objectionable brittleness in the molding compositions while exerting the desired color-stabilizing action.

A further object of this invention is the production of novel, long chain polymeric organic esters of sulfurous acid which are suitable for use as stabilizing agents for thermoplastic cellulose derivative compositions.

Other objects of this invention will appear from the following detailed description.

While our invention will be more particularly described in connection with the stabilization of thermoplastic molding compositions having a basis of ethyl cellulose, equally valuable results are obtained in stabilizing other cellulose ethers, such as benzyl cellulose, as well as cellulose esters such as, cellulose nitrate, cellulose acetate, cellulose propionate, cellulose butyrate, cellulose acetate-propionate and cellulose acetate-butyrate.

Thermoplastic compositions having a basis of ethyl cellulose, which are widely employed commercially for the preparation of molded articles, possess certain characteristics which impair their utility. For example, some molded ethyl cellulose compositions possess an inherent yellowish color even prior to molding, while others frequently develop yellowish or yellowish brown colors during processing operations, particularly where the processing operations include the use of heat.

Where some color is initially present in the ethyl cellulose compositions, this color may bleach to a lighter shade, or even disappear upon exposure to light. This characteristic of color instability makes a standardized or controlled application of such ethyl cellulose compositions quite difficult. Where, for example, a colorist is working with an ethyl cellulose composition which possesses some color initially, he may be able to match a particular shade to a known, colored standard without difficulty. However, on prolonged exposure of the colored compositions to light, changes in shade will occur to a very noticeable degree due to a loss of some of the color initially present in the sample because of the bleaching action of the light. When working with a particular ethyl cellulose which develops some color on molding or during other processing operations involving the use of heat, the color which is known to develop must be compensated for with care in order that the final molded product will have the exact shade which is desired. Even the slightest deviation from the desired molding conditions, such as, for example, a slight increase or decrease in the time or temperature of molding, will noticeably alter the shade.

The use of many stabilizers has been proposed in order to overcome this tendency toward color instability. The object of incorporating such stabilizing agents in the ethyl cellulose compositions is to minimize any changes in shade due to the action of light or heat where the ethyl cellulose possesses some color initially, or where the ethyl cellulose tends to develop some color when molded. Color stabilization methods presently employed are characterized by the fact that they effect a marked lowering in the viscosity, heat stability and/or resistance to crazing of the stabilized material and by the fact that many of these materials of themselves impart an undesirable degree of color to the stabilized ethyl cellulose compositions. The application of stabilizing agents which do not possess these drawbacks would render thermoplastic molding compositions of ethyl cellulose much more useful and more widely applicable.

We have found that thermoplastic ethyl cellulose molding compositions may be stabilized very effectively against color changes by incorporating therein certain organic sulfites comprising the polyhydroxy alcohol esters of sulfurous acid. These esters may be obtained by reacting a suitable polyhydroxy alcohol with thionyl chloride. Examples of suitable polyhydroxy alcohols which may be employed in forming said organic sulfite stabilizing agents by reaction with thionyl chloride are ethylene glycol, di-ethylene glycol, tri-ethylene glycol, 1,2-propylene glycol, di-propylene glycol, 2-ethyl hexanediol-1,3, 2-methyl-hexanediol-2,4, 2,3-butanediol, diglycerol, 1,3-butanediol and 1,4-butanediol, also octamethylene glycol, and decamethylene glycol. The by-product hydrogen chloride, which forms during the course of the reaction, is removed either by effecting the reaction in the presence of a suitable acid binding agent such as pyridine, by sweeping the reaction vessel during the reaction with a stream of air or a stream of an inert gas, or by continuously evacuating the reaction vessel to withdraw the hydrogen chloride. The organic sulfite may then be purified by fractional distillation, and the like.

Since both the polyhydroxy alcohols and the thionyl chloride are bifunctional compounds, the sulfite esters formed during said esterification are either cyclic compounds or long chain polymeric compounds of relatively high molecular weight and low volatility. Where, for example, two carbon atoms separate the hydroxy groups of the polyhydroxy alcohol, as in the case of ethylene glycol, the reaction with thionyl chloride gives a good yield of the cyclic compound, ethylene sulfite, having the following formula:

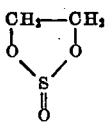

Where the polyhydroxy alcohol employed contains three carbon atoms separating the hydroxy groups, as in the case of 1,3-butanediol, a mixture of cyclic esters and polymeric esters comprising cyclic 1,3-butanediol sulfite and poly-1,3-butanediol sulfite is obtained. These compounds are novel. Examples of other novel cyclic sulfites are 1,2-propanediol sulfite, 2-methyl-2,4-pentanediol sulfite and 2-ethyl-1,3-hexanediol sulfite. The use of pyridine in the reaction as an acid-binding agent favors the formation of the polymeric compound.

When, however, a chain of four or more carbon atoms separates the hydroxy groups, as in the case of 1,4-butanediol, which chain may or may not be interrupted by an oxygen atom or the like, as in the case of di-ethylene glycol, we have found that long chain polymeric sulfurous acid esters of relatively high molecular weight are obtained. These long chain polymeric esters are novel and possess the following structure:

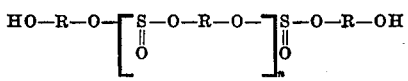

wherein n is an integer, e. g. 1 to 15 or more, R is a chain containing at least four carbon atoms and is the divalent residue normally linking the hydroxy groups of the polyhydroxy alcohol. Thus, for example, when 1,4-butanediol is reacted with thionyl chloride, poly-1,4-butanediol sulfite is obtained. When di-ethylene glycol, or tri-ethylene glycol, is reacted with thionyl chloride, poly-diethylene glycol sulfite or poly-tri-ethylene glycol sulfite is obtained. Additional examples of our novel long chain polymeric organic sulfites are poly-1,10-decanediol sulfite, poly-dipropylene glycol sulfite and poly-diglycerol sulfite, all of which are heavy, viscous liquids or resins of extremely low volatility and practically no odor and are found to be particularly advantageous as stabilizers for ethyl cellulose compositions.

The esterification is usually effected by reacting equimolecular quantities of the desired polyhydroxy compound with thionyl chloride in a suitable jacketed vessel, preferably at a temperature below about 35° C. and removing the hydrogen chloride continuously as it is formed. The evolution of the gaseous hydrogen chloride cools the reaction mass so that sufficient heat should be supplied to the reaction vesesl, if undue cooling takes place, to maintain the temperature at about .15 to 35° C. during the esterification. In some instances, however, very low reaction temperatures, i. e. about —20 to —50° C., are satisfactory, particularly where undesirable side reactions, such as dehydration of the polyhydroxy compounds with the formation of cyclic ethers, take place at higher reaction temperatures. The hydrogen chloride remaining in the reaction mixture is neutralized by slowly pouring the oily reaction mixture into an aqueous solution of sodium carbonate or other neutralizing agent while continuously agitating to maintain the organic sulfite in a finely divided form. After the thoroughly neutralized organic sulfite reaction product has settled, the upper water layer is drawn off and the organic sulfite again washed, this wash being effected, usually, with an equeous solution of sodium sulfate. The neutralized organic sulfite is then dried with the aid of heat and vacuum, the temperature of the organic sulfite being raised to 100 to 110° C. employing a vacuum of 29 to 30 inches of mercury. The organic sulfite is then filtered while hot, and stored prior to use.

When said organic sulfites are incorporated in ethyl cellulose compositions in amounts of from 0.1 to 5 parts by weight for each 100 parts by weight of ethyl cellulose present, the resulting composition is found to be of excellent stability and may be exposed to high temperatures during molding, extrusion and the like without the development of an undesirable yellow or yellow-brown color in the molded material.

The stabilizing agents may be incorporated in the ethyl cellulose molding compositions in any convenient manner. They may be mixed with the ethyl cellulose in flake form during the preparation or final washings of the ethyl cellulose or after it is dried and prior to colloidallization or they may be dissolved or suspended in the plasticizers employed and the solution obtained then combined with the ethyl cellulose. They may also be mixed with the volatile solvents in which the ethyl cellulose is dissolved if a solvent casting operation is employed, as in the preparation of film materials. The stabilizing agents may also be added directly to the plastic mass while it is being converted or colloided at elevated temperature on hot rolls, or in a suitable mill as, for example, a Banbury mixer or a Werner-Pfleiderer kneader.

The stabilizing agents are also highly effective when incorporated in sheets, rods, tubes, films, foils, etc., particularly where the production of said materials involves the use of heat. For example, in the production of sheets by the "block" method, rolled slabs of the cellulose derivative are consolidated under heat and pressure to form a solid cake or block from which sheets are cut. The use of said stabilizers renders the thermoplastic material highly resistant to the detrimental effects of high temperature during the consolidation or molding of the block. Said stabilizers are also valuable when incorporated in films and foils since the latter are frequently exposed to elevated temperatures as during drying, heat-sealing or laminating operations. In some instances said stabilizing agents also may be employed as solvent plasticizers.

The organic sulfites employed as stabilizing agents in accordance with the process of our invention have no detrimental effect upon the plasticizers, dyes or pigments normally employed in the preparation of ethyl cellulose or other cellulose ether molding compositions.

Suitable colors which may be employed to produce the desired color effects in the final molded ethyl cellulose composition are, for example, Cobalt Purple, Cadmium Selenide Red, Chrome-Orange, Ultramarine Blue, Van Dyke Brown, Monastrol Blue and Calco Condensation Yellow.

Various plasticizers may be employed alone, or in combination, to impart particular properties to the composition. The plasticizers are valuable for obtaining the desired flow characteristics, resistance to water, grease or oil, flexibility, hardness or other particular properties. Thus, for example, plasticizers, such as di-butyl phthalate, n-butyl stearate, tri-cresyl phosphate, triphenyl phosphate, butyl "Cellosolve" stearate, partially hydrogenated isomeric terphenyls, etc. may be satisfactorily employed in the preparation of our novel ethyl cellulose compositions. These plasticizers may be employed in amounts of 0 to 50% or more by weight on the ethyl cellulose present in the composition. Lubricant plasticizers, such as certain refined mineral oils, may also be employed in amounts of from 0 to 25% or more on the weight of the ethyl cellulose.

The ethyl cellulose employed in accordance with our invention may have an ethoxyl value of 44 to 49%.

In order further to illustrate our invention, but without being limited thereto, the following examples are given:

*Example I*

1 mol of di-ethylene glycol is charged into a jacketed, glass-lined reactor, cooled to 15° C. and then 1.02 mols of thionyl chloride are gradually added below the surface of the di-ethylene glycol. The temperature is kept below 35° C. by circulating a suitable cooling medium through the jacket of the reactor. The thionyl chloride is added slowly due to the rapid increase in temperature prior to the evolution of the hydrogen chloride. As the hydrogen chloride begins to evolve from the reaction mass the temperature falls rapidly and steam is admitted to the jacket to maintain the temperature at about 20° C. The reactor is continuously evacuated as the hydrogen chloride evolves and dried air in then bubbled through the mixture to agitate it and to aid in sweeping the hydrogen chloride therefrom. The reaction mixture obtained is then slowly drawn by vacuum into a 10% aqueous solution of sodium carbonate while agitating the mixture. Agitation is continued to insure thorough neutralization of any of the hydrogen chloride remaining in the reaction mass. The mixture is allowed to settle, the upper water layer drawn off and the oily poly-di-ethylene glycol sulfite is washed with an aqueous solution of sodium sulfate. The oily layer of poly-di-ethylene glycol sulfite is then dried by the application of heat under a vacuum. The temperature of the poly-di-ethylene glycol sulfite is raised to 100 to 110° C. while subjecting it to a vacuum of 29 to 30 inches of mercury. When it is thoroughly dried a diatomaceous earth filter aid is added and the hot oily liquid is filtered. A yield of 75% of theoretical is obtained. The product is a long chain polymer having about 11 times the theoretical molecular weight of di-ethylene glycol sulfite. The novel poly-di-ethylene glycol sulfite has a specific gravity at 25° C. of 1.397, a refractive index ($n_D^{25}$) of 1.4935 and is soluble in water to the extent of less than 0.02%. The boiling point is quite high. Even at 0.005 mm. pressure the poly-di-ethylene glycol begins to decompose and to liberate sulfur dioxide before any distillation can be accomplished.

As a stabilizing agent, the poly-di-ethylene glycol may be employed in the following manner:

100 parts by weight of ethyl cellulose flake having an ethoxy value of 45%, 15 parts by weight of dibutyl phthalate and 2 parts by weight of the poly-di-ethylene glycol sulfite are mixed thoroughly and the mixture molded into discs at 200° C. for 15 minutes. The discs obtained have a yellowness coefficient of .25 while discs molded of plasticized ethyl cellulose from which the stabilizer has been omitted have a yellowness coefficient of .72.

The numerical expression of color development, i. e. the yellowness coefficient, is obtained by determining the light transmission of the sample in question at 640 m$\mu$ minus that at 440 m$\mu$ divided by the light transmission at 640 m$\mu$; the greater this coefficient, the greater the degree of color.

*Example II*

A molding powder is prepared from the following composition:

| | Parts by weight |
|---|---|
| Ethyl cellulose (46% ethoxyl) | 100 |
| Partially hydrogenated isomeric terphenyls | 16.4 |
| Refined mineral oil | 7.8 |
| Poly-di-ethylene glycol sulfite | 0.6 |
| Cadmium Selenide Red | 0.1 |

The composition is mixed on hot converting rolls which are heated to a temperature of 150° C. until it is thoroughly homogeneous, taken off in thin sheets, cooled and the latter then ground up into finely divided particles suitable for molding. Standard test bars for the Izod impact test are molded of this composition and when tested show an impact strength of 10.2 foot pounds per inch of notch. The impact strength of the same composition from which the stabilizer has been omitted is only 8.5 foot pounds, clearly showing the reduction in brittleness produced by the use of this novel stabilizer.

*Example III*

418 parts by weight (5.5 mols) of 1,2-propylene glycol (propanediol-1,2) are placed in a suitable reaction vessel and the latter evacuated. 682 parts by weight of thionyl chloride (5.72 mols) are then added slowly with stirring so that the temperature is maintained at 25 to 30° C. The hydrogen chloride is continuously evacuated as formed and when the cooling effect of the vaporizing hydrogen chloride reduces the temperature excessively heat is applied to maintain the temperature at 25 to 30° C. When the addition of thionyl chloride is completed the reaction mixture is allowed to boil for 10 minutes under a pressure of 50 mm. of mercury to complete the removal of the hydrogen chloride. The reaction mixture is then cooled and poured into a solution of 15 parts by weight of sodium carbonate in 150 parts by weight of water and stirred rapidly. The oily layer is separated, distilled at about 90 to 92° C. under a pressure of 50 mm. and water-white 1,2-propylene sulfite is obtained. The 1,2-propylene glycol sulfite has a molecular weight of 122, boils at about 174° C. at atmospheric pressure, has a density of 1.2882 at 25° and a refractive index of ($n_D^{25}$) of 1.4361. It is soluble in water at 25° C. to the extent of about 8% and water is soluble therein to the extent of about 2.1% at 25° C.

As a stabilizing agent, the 1,2-propylene sulfite may be employed in the following manner:

100 parts by weight of ethyl cellulose flakes of 44.5% ethoxyl value are mixed with 13 parts by weight of dibutyl phthalate and 2 parts by weight of 1,2-propylene sulfite until a uniform mixture is obtained. The plasticized ethyl cellulose is then molded into discs at 200° C. for 15 minutes. The discs obtained have a yellowness coefficient of .18 while discs molded of the same plasticized ethyl cellulose composition to which the stabilizer has not been added have a yellowness coefficient of .67.

*Example IV*

One mol of thionyl chloride is slowly added to one mol of ethylene glycol, with the temperature being kept at 25 to 30° C., by ice-cooling. Most of the hydrogen chloride is removed by evacuation of the reaction vessel. The mixture is neutralized by pouring into 10% aqueous sodium carbonate solution. After separation and drying, the oil is distilled. The yield of distilled ester is 92% of theory. The cyclic ethylene glycol sulfite obtained is a water-white liquid which boils at 92° C. at a pressure of 50 mm., has a density of 1.4320 at 25° C., and a refractive index ($n_D^{25°}$) of 1.4451. It decomposes at 172° C. at atmospheric pressure. It is soluble in water at 25° C. to the extent of about 16% while water is soluble therein at 25° C. to the extent of about 3.8%.

100 parts by weight of flake ethyl cellulose of 47% ethoxyl value are mixed with 13 parts of dibutyl phthalate and 2 parts by weight of ethylene glycol sulfite. The plasticized ethyl cellulose mixture obtained is then molded into discs at 200° C. for 15 minutes. The discs obtained have a yellowness coefficient of .16 while discs molded of the same ethyl cellulose composition, but unstabilized, have a yellowness coefficient of .67.

The stabilized ethyl cellulose composition above may also be subjected to conversion on hot rolls, as during the preparation of molding powder, without developing excessive color. The ethyl cellulose composition is rolled at 275° F. and samples are removed at the end of 15 minutes, 30 minutes, 45 minutes and 60 minutes of rolling. Each sample is then molded into slabs for 5 minutes at 200° C. The yellowness coefficients of the several molded samples containing the stabilizer as compared to an unstabilized ethyl cellulose composition subjected to the same treatment are:

| Rolling Time | Yellowness Coefficient | |
|---|---|---|
| | Stabilized | Unstabilized |
| 15 min | .37 | .76 |
| 30 min | .42 | .85 |
| 45 min | .48 | .90 |
| 60 min | .53 | .95 |

*Example V*

One mol of thionyl chloride is cooled to −64° C. and then one mol of 1,4-butanediol is slowly added thereto. The temperature rises somewhat but is maintained between about −20 to −45° C. during the course of the esterification. The hydrogen chloride formed is continuously evacuated and the hydrogen chloride remaining at the completion of the esterification is removed by heating the reaction mixture to room temperature under 0.1 mm. pressure. The oily product is washed with a 5% aqueous sodium carbonate solution. A yield of 78% of a crude viscous oily product is obtained.

We have also prepared various other cyclic and polymeric sulfurous acid esters and their properties are indicated in the table below:

| Cyclic Sulfite of— | Boiling Point °C./mm. mercury pressure | Density ($d_4^{25}$) | Refractive Index ($n_D^{25}$) |
|---|---|---|---|
| 1,3-butanediol | 63° C./10 | 1.234 | 1.4447 |
| 2,3-butanediol | 67–8° C./9 | 1.215 | 1.4349 |
| 2-methyl-2,4-pentanediol | 71–3° C./3.5 | | 1.4528 |
| 2-ethyl-1,3-hexanediol | 93–4° C./3 | 1.092 | 1.4543 |

| Polymeric Sulfite of— | Remarks | Density ($d_4^{25}$) | Refractive Index ($n_D^{25}$) |
|---|---|---|---|
| 1,3-butanediol | very viscous oil | | |
| 1,10-decanediol | wax-like substance | | |
| Dipropylene glycol | viscous oil | 1.147 | 1.4602 |
| Triethylene glycol | very viscous oil | 1.264 | 1.4789 |

*Example VI*

Further evaluation of the above sulfurous acid esters as color stabilizers indicates that, even in small amounts, said compounds are highly effective in preventing the development of undesirable brownish tints during molding operations. Thus, for example, when 1 part by weight of each of the following sulfites are incorporated in 100 parts by weight of ethyl cellulose plasticized with 15 parts by weight of dibutyl phthalate and the compositions obtained then molded into discs at 200° C. for 15 minutes, the following results are obtained:

| Stabilizer | Yellowness Coefficient of Molded Disc |
|---|---|
| Control (no stabilizer) | .70 |
| Cyclic ethylene glycol sulfite | .20 |
| Cyclic 1,2-propanediol sulfite | .23 |
| Cyclic 1,3-butanediol sulfite | .36 |
| Cyclic 2,3-butanediol sulfite | .33 |
| Cyclic 2-methyl-2,4-pentanediol sulfite | .23 |
| Cyclic 2-ethyl-1,3-hexanediol sulfite | .37 |
| Polymeric 1,3-butanediol sulfite | .36 |
| Polymeric 1,4-butanediol sulfite | .34 |
| Polymeric 1,10-decanediol sulfite | .48 |
| Polymeric diethylene glycol sulfite | .30 |
| Polymeric dipropylene glycol sulfite | .34 |
| Polymeric triethylene glycol sulfite | .30 |
| Polymeric diglycerol sulfite | .24 |

*Example VII*

100 parts by weight of ethyl cellulose of 45% ethoxyl value are mixed with 14 parts by weight of dibutyl phthalate and one part by weight of stabilizer and the resulting composition processed for 15 minutes on hot rolls at 275° C., and then molded into discs for 5 minutes at 200° C. The results obtained are as follows:

| Stabilizer | Yellowness Coefficient of Molded Disc |
|---|---|
| Control (no stabilizer) | .84 |
| Cyclic ethylene glycol sulfite | .41 |
| Cyclic 1,2-propanediol sulfite | .58 |
| Cyclic 1,3-butanediol sulfite | .50 |
| Cyclic 2,3-butanediol sulfite | .52 |
| Polymeric diethylene glycol sulfite | .40 |

These results indicate the excellent stabilizing action of said sulfites on ethyl cellulose material processed under these fairly drastic conditions. The relatively low volatility of these sulfites enables them to be retained and to exert the desired stabilizing action even though the compositions are subjected to high temperatures.

It is quite apparent that the use of organic sulfites comprising the polyhydroxy alcohol esters of sulfurous acid as stabilizing agents for cellulose derivative molding compositions yields extremely valuable results.

It is to be understood that the foregoing detailed description is given merely by way of illustration and that many variations may be made therein without departing from the spirit of our invention.

Having described our invention, what we desire to secure by Letters Patent is:

1. A substantially color-stable composition of matter resistant to color changes under the action of heat or light, comprising a thermoplastic cellulose derivative of the group consisting of cellulose ethers and cellulose esters having incorporated therewith as a color stabilizing agent a polyhydroxy alcohol ester of sulfurous acid.

2. A substantially color-stable composition of matter resistant to changes under the action of heat or light, comprising a thermoplastic cellulose derivative of the group consisting of cellulose ethers and cellulose esters having incorporated therewith as a color stabilizing agent, a polymeric polyhydroxy alcohol ester of sulfurous acid having the following structure:

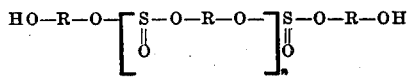

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

3. A substantially color-stable composition of matter resistant to color changes under the action of heat or light, comprising a thermoplastic cellulose ether having incorporated therewith as a color stabilizing agent a polyhydroxy alcohol ester of sulfurous acid.

4. A substantially color-stable composition of matter resistant to changes under the action of heat or light, comprising a thermoplastic cellulose ether having incorporated therewith as a color stabilizing agent, a polymeric polyhydroxy alcohol ester of sulfurous acid having the following structure:

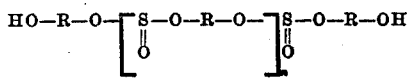

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

5. A substantially color-stable composition of matter resistant to color changes under the action of heat or light, comprising a thermoplastic cellulose ester having incorporated therewith as a color stabilizing agent a polyhydroxy alcohol ester of sulfurous acid.

6. A substantially color-stable composition of matter resistant to changes under the action of heat or light, comprising a thermoplastic cellulose ester having incorporated therewith as a color stabilizing agent, a polymeric polyhydroxy alcohol ester of sulfurous acid having the following structure:

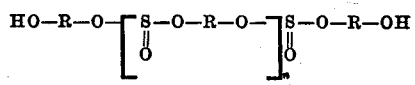

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

7. A substantially color-stable composition of matter resistant to color changes under the action of heat or light, comprising ethyl cellulose having incorporated therewith as a color stabilizing agent a polyhydroxy alcohol ester of sulfurous acid.

8. A substantially color-stable composition of matter resistant to changes under the action of heat or light, comprising ethyl cellulose having incorporated therewith as a color stabilizing agent, a polymeric polyhydroxy alcohol ester of sulfurous acid having the following structure:

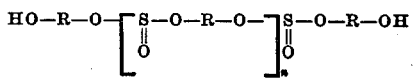

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

9. A substantially color-stable composition of matter resistant to changes under the action of heat or light, comprising ethyl cellulose having incorporated therewith as a color stabilizing agent, a polymeric polyhydroxy alcohol ester of sulfurous acid having the following structure:

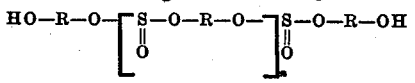

wherein $n$ is an integer no greater than 15 and R is a saturated straight chain containing at most carbon, hydrogen and oxygen and at least four and at most ten carbon atoms and an oxygen atom linked to two carbon atoms and is the divalent residue normally linking the hydroxy groups of a polyhydroxy alcohol.

10. A substantially color-stable composition of matter resistant to color changes under the action of heat or light comprising ethyl cellulose having poly-di-ethylene glycol sulfite incorporated therewith as a color stabilizing agent.

11. A substantially color-stable composition of matter resistant to color changes under the action of heat or light, comprising ethyl cellulose having 1,2-propylene sulfite incorporated therewith as a color stabilizing agent.

12. A substantially color-stable composition of matter resistant to color changes under the action of heat or light, comprising ethyl cellulose having ethylene sulfite incorporated therewith as a color stabilizing agent.

13. A substantially color-stable composition of matter resistant to color changes under the action of heat or light, comprising cellulose acetate having incorporated therewith as a color stabilizing agent a polyhydroxy alcohol ester of sulfurous acid.

14. A substantially color-stable composition of matter resistant to changes under the action of heat or light, comprising cellulose acetate having incorporated therewith as a color stabilizing agent, a polymeric polyhydroxy alcohol ester of sulfurous acid having the following structure:

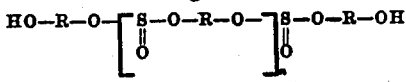

wherein $n$ is an integer no greater than 15 and R is a saturated straight chain containing at most carbon, hydrogen and oxygen and at least four and at most ten carbon atoms and is the divalent residue normally linking the hydroxy groups of a polyhydroxy alcohol.

15. A substantially color-stable composition of matter resistant to changes under the action of heat or light, comprising cellulose acetate having incorporated therewith as a color stabilizing agent, a polymeric polyhydroxy alcohol ester of sulfurous acid having the following structure:

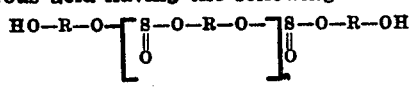

wherein $n$ is an integer no greater than 15 and R is a saturated straight chain containing at most carbon hydrogen, and oxygen and at least four and at most ten carbon atoms and an oxygen atom linked to two carbon atoms and is the divalent residue normally linking the hydroxy groups of a polyhydroxy alcohol.

WILLIAM J. MYLES.
JOHN H. PRICHARD.

REFERENCES CITED

The following references are of record in the file of this patent:

UNITED STATES PATENTS

| Number | Name | Date |
| --- | --- | --- |
| 2,069,774 | Reid | Feb. 19, 1937 |
| 2,205,232 | Tisdale | June 18, 1940 |
| 2,243,331 | de Simo | May 27, 1941 |
| 2,257,969 | Loane | Oct. 7, 1941 |
| 2,377,148 | Heckenbleikner | May 29, 1945 |
| 2,383,361 | Bass et al. | Aug. 21, 1945 |